April 19, 1938. S. BLOOMFIELD 2,114,277
BUTTER CUTTER
Filed Aug. 13, 1936
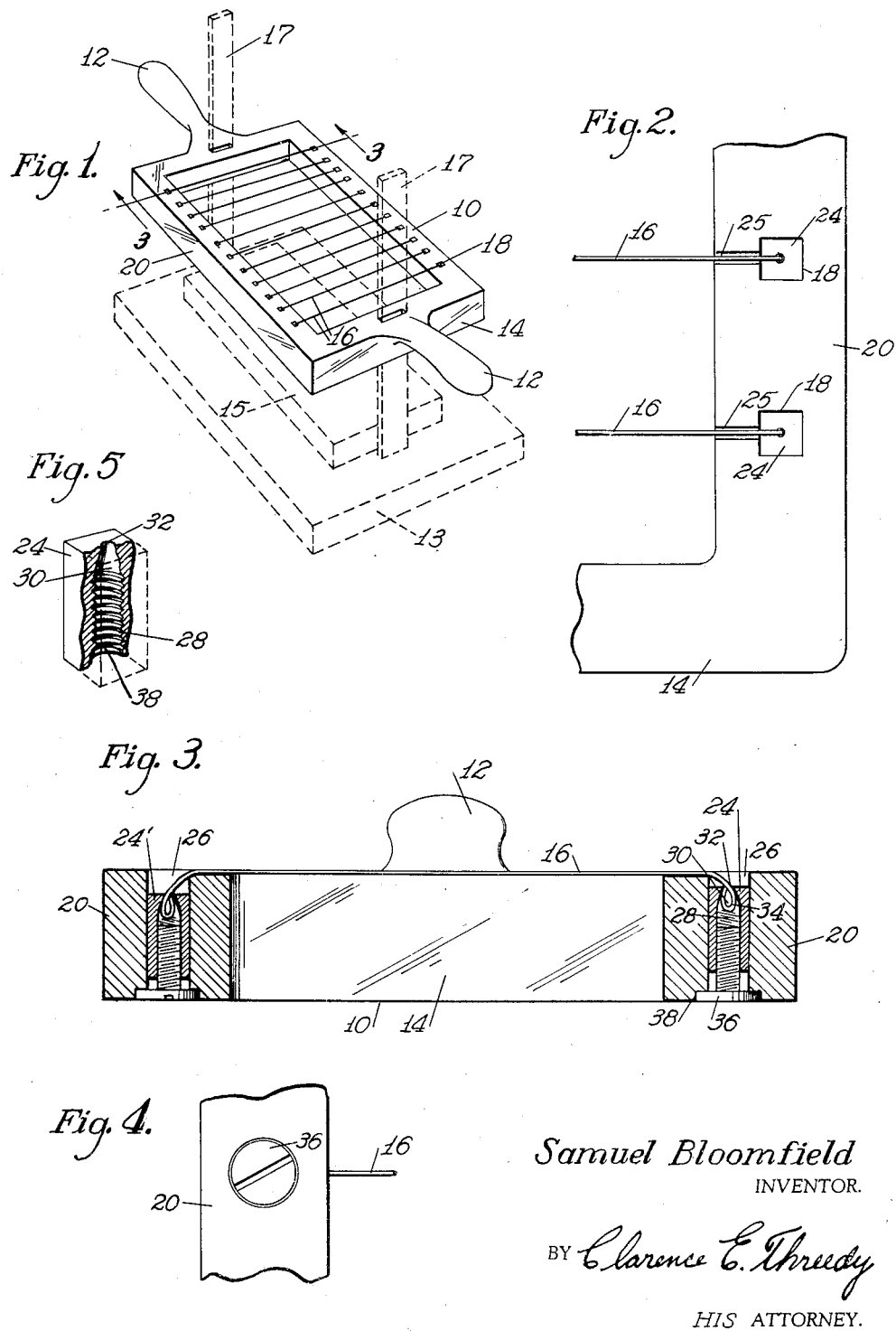
Samuel Bloomfield
INVENTOR.
BY Clarence E. Threedy
HIS ATTORNEY.

Patented Apr. 19, 1938

2,114,277

UNITED STATES PATENT OFFICE 2,114,277

BUTTER CUTTER

Samuel Bloomfield, Chicago, Ill.

Application August 13, 1936, Serial No. 95,815

8 Claims. (Cl. 31—22)

This invention relates to cutting devices and more particularly to improvements in mechanisms for cutting butter, cheese and the like.

A particular object of the invention is the provision of improved mechanism in such cutting devices for engaging the cutting elements thereof.

A further and more particular object is the provision of improved means for supporting and adjusting cutting wires in the frame member of a butter cutting device.

Other novel provisions and objects residing in the structure and function of the invention will appear as the detailed description develops in view of the annexed drawing in which:

Fig. 1 is a perspective view of a form of cutter including the improvements of the present invention;

Fig. 2 is an enlarged fragmentary plan view of the cutting wires and improved mounting means therefor;

Fig. 3 is a sectional view of the cutter frame and wire mounting means taken on line 3—3 of Fig. 1;

Fig. 4 is a bottom plan detail of the adjusting element of the wire or cutter engaging mechanism; while Fig. 5 is a sectionalized perspective of a tensioning stud showing the threaded well with its reduced end portion.

The improvements of the present invention relate to butter and cheese cutting devices of the type generally indicated in Fig. 1 and which improvements include a substantially rectangular frame member 10 having handles 12 extended from opposite lateral end portions 14 of the frame, and a plurality of cutting elements or wires 16 extended in parallel laterally of the frame for adjustable anchoring in anchoring or engaging devices 18 seated in the longitudinally extensive frame portions 20.

In the art as heretofore practiced, the cutting member 16 had been commonly stretched across the frame by means of studs seated in the frame extremities for rotative movement therein, and having portions extended above the frame in the plane thereof with the cutting member extended through suitable transverse apertures in the studs and screw means for retracting the cutting members back into the frame to stretch the same taut.

Experience has shown that with this type of supporting and tensioning mechanism where the cutting members are wires, as well as others generally in use, that there is a shearing effect upon the wires or a tendency to crimp them and in time to weaken them so that shearing or snapping is practically certain to occur as a result of the continual tensioning and adjustment which is necessary in the use of such devices due to the inherent tendency of the wires to yield under tensioning and operating stresses.

In the practice of my invention I provide, as shown in Fig. 3 particularly, a square stud 24 which is slidable normal to the plane of the frame 10 in slots 26 therein, such slots being spaced apart at suitable intervals in opposite members of the frame.

These studs 24 are provided with a longitudinal well 28 which is screw threaded from one extremity of the stud approximately to the opposite extremity of the well, the said last extremity terminating in a conically reduced portion 30 which communicates through a small aperture 32 to the adjacent extremity of the stud. A cutting element 16 in the form of a wire of suitable tensile qualities is mounted in the frame by extending an end portion into the aperture 32 and through the entire extent of the well 28 to have such portion bent or crimped back upon itself to form a loop 34, and thereafter the free end portion of the wire is drawn back into well 28 until the loop 34 abuts the extremity of the reduced portion 30 thereof.

Thereafter a tensioning screw with an enlarged head 36 is threaded into the tapped or threaded part of the well 28 and is adapted to have the head portion 36 seat in a recess 38 in the bottom portion of the frame 10 (see Fig. 4).

The opposite extremity of this same wire 16 may be similarly mounted in a companion tensioning stud 24' in the oppositely disposed frame member as shown in Fig. 3. It will be apparent that any desired number of cutting wires may be so mounted in the cutting frame, and in the embodiment shown for illustrative purposes I have indicated in Fig. 1 a simple form of cutting mechanism to which has been applied the improved cutter securing or mounting device of the present invention, the embodiment including a base member 13 here shown in dotted lines, with a cutting block 15 supported thereon and a pair of guide posts 17 extended upwardly from the base 13 at the extremities of the cutting block 15. The frame member 10 has a pair of slots in the lateral frame members opposite the handles 12 adapted to slidably engage the guide posts 17.

In the operation of the device, a suitable number of cutting wires having been provided as shown in Fig. 1 and applied to the tensioning or mounting mechanism in the manner above described, the wires may be tensioned by turning the headed screws 36 of the tensioning screws (Fig. 3) to draw the studs 24 and 24' inwardly in the square frame slots 26.

The looped portions 34 of the several wires will thus be drawn upwardly into the conically reduced portions 30 of the well 28 and tend to wedge the wires in the wells as the backward movement of the studs continues. The square slots 26 may be provided with a curved marginal surface at the juncture of their upper extremities with the frame members 20, so that all shearing action and torsional effects may be avoided as the wires 16 are drawn into the apertures or slots 26 by the retraction of studs 24, and to this end, I also may provide channels 25 extending from the region of the curved marginal surfaces of the apertures to the inner edges of the frame for the purpose of seating and guiding the cutters 16. (Fig. 2.)

It will be apparent to those skilled in the art that I have provided a mechanism for tautening the cutting wires of butter or cheese cutters which is simple and very readily manipulated, and is, notwithstanding, susceptible of modification without departing from the spirit of the invention, and I do not wish to limit the construction of the device to the specific details recited herein, but rather I desire to avail myself of all the modifications, variations, and combinations of the invention to which I may be entitled in view of the following claims.

I claim:

1. An improved means for adjustably mounting the cutting wires of a butter cutter and which includes a stud slidably mounted in the frame member of a cutter and having a hollow central portion terminating in a reduced portion having communication with an extremity of the stud and having a cutting wire extended through said aperture into said hollow portion and looped back upon itself therein, and means threadable into said hollow portion and having a part bearing against said frame whereby the said stud may be retracted and advanced in said frame.

2. An improved means for adjustably mounting the cutting wires of a butter cutter and which includes a square stud slidably mounted in the frame member of a cutter and having a hollow central portion terminating in a reduced portion having communication with an extremity of the stud, and having a cutting wire extended through said aperture into said hollow portion and looped back upon itself therein, and means threadable into said hollow portion and having a part bearing against said frame whereby the said stud may be retracted and advanced in said frame.

3. An improved means for adjustably mounting the cutting wires of a butter cutter and which includes a stud slidable in an aperture in a frame and keyed against rotative movement in said aperture, and having a cutting wire extended through an aperture into a said hollow portion thereof and looped back upon itself therein, and means threadable into said hollow portion and having a part bearing against said frame whereby the said stud may be retracted and advanced in said frame.

4. Means for mounting cutter wires in a frame for butter cutters and the like, said means comprising a stud slidable in said frame, means threadably engaging said stud to slide the latter back and forth in said frame, said stud having a tapered hollow portion communicating through an extremity thereof through which a cutter wire is extended with an end looped back upon itself within said tapered portion.

5. Means for mounting cutter wires in a frame for butter cutters and the like, said means comprising a square stud slidable in said frame, means having bearing engagement with said frame and threadably engaging said stud to slide the latter back and forth in said frame, and said stud having a tapered hollow portion communicating through an extremity through which is passed a cutter wire having an end looped back upon itself within said tapered portion.

6. Means for mounting cutter wires in a frame for butter cutters and the like, said means comprising a stud slidable in said frame, said stud being immovable radially of its sliding axis, means threadably engaging said stud to slide the latter back and forth in said frame, said stud having a hollow portion communicating through an extremity thereof through which is extended a cutter wire having an end looped back upon itself within said tapered portion.

7. Means for mounting cutter wires in a frame for butter cutters and the like, said means comprising a stud slidable in said frame and provided with means preventing rotation about its sliding axis, means threadably engaging said stud to slide the latter back and forth in said frame, said stud having a constricted sleeve portion communicating through an extremity thereof into which is extended a cutter wire secured therein by having an end looped back upon itself within said sleeve portion, the said means threadably engaging said stud having a headed part seated in a recess in said frame.

8. An adjustable wire attaching means for use with wire grids including a mounting frame, said means including a stud having a sleeve portion with a reduced opening at one end and mounted for longitudinal sliding movement in a bore in said frame, said stud having formations preventing rotative movement about its sliding axis in said bore, said stud further having a wire inserted therein through said reduced end opening, said wire having an enlarged end formation preventing withdrawal from said stud and being attached at its opposite end to said frame at a point remote from said stud, together with means for adjustably tensioning said wire and including a headed member threadable into the sleeve portion of said stud, the headed portion thereof bearing against said frame whereby said stud may be moved in said bore to tauten said wire.

SAMUEL BLOOMFIELD.